US011537103B2

(12) United States Patent
Onose (10) Patent No.: US 11,537,103 B2
(45) Date of Patent: Dec. 27, 2022

(54) DATA COLLECTION SETTING DEVICE OF INDUSTRIAL MACHINE

(71) Applicant: FANUC CORPORATION, Yamanashi (JP)

(72) Inventor: Nao Onose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 95 days.

(21) Appl. No.: 16/853,300

(22) Filed: Apr. 20, 2020

(65) Prior Publication Data

US 2020/0379431 A1 Dec. 3, 2020

(30) Foreign Application Priority Data

May 31, 2019 (JP) .............................. JP2019-102718

(51) Int. Cl.
*G05B 19/408* (2006.01)
*G05B 19/418* (2006.01)
*G05B 19/4093* (2006.01)

(52) U.S. Cl.
CPC ..... *G05B 19/408* (2013.01); *G05B 19/40938* (2013.01); *G05B 19/4183* (2013.01); *G05B 2219/31288* (2013.01)

(58) Field of Classification Search
CPC ............ G05B 19/408; G05B 19/40938; G05B 19/4183; G05B 2219/31288

(Continued)

(56) References Cited

U.S. PATENT DOCUMENTS 10,434,418 B2 * 10/2019 Dauphiny ............. A63F 13/352
2002/0133264 A1 * 9/2002 Maiteh ............... G05B 19/4097
700/182

(Continued)

FOREIGN PATENT DOCUMENTS

EP 3318944 A2 * 5/2018 ......... G05B 23/0216
EP 3482887 A1 * 5/2019 ............ B25J 9/1676
JP 2018173858 A 11/2018

OTHER PUBLICATIONS

An Office Action issued by the United States Patent and Trademark Office on Mar. 22, 2021, which corresponds to U.S. Appl. No. 16/857,275 and is related to U.S. Appl. No. 16/853,300.

*Primary Examiner* — Hien D Khuu
(74) *Attorney, Agent, or Firm* — Studebaker & Brackett PC (57) ABSTRACT

A data collection setting device of an industrial machine includes: a display unit that displays augmented reality; an industrial machine identifying unit that identifies the industrial machine in the real world displayed on the display unit; a data display control unit that displays, on the display unit, a virtual object relating to the data which are collectable in the identified industrial machine; a data collecting device display control unit that displays, on the display unit, an object indicating the data collecting device; an operation determining unit that determines operation of an operator with respect to the virtual object relating to the data and the object indicating the data collecting device displayed on the display unit, and identifies the data and the data collecting device; and a data collection setting generating unit that generates a setting for collecting the identified data of the industrial machine (10) in the identified data collecting device.

8 Claims, 5 Drawing Sheets

(58) Field of Classification Search
USPC .......................................................... 700/159
See application file for complete search history.

(56) References Cited

U.S. PATENT DOCUMENTS

| | | | |
|---|---|---|---|
| 2006/0241792 A1* | 10/2006 | Pretlove | G06Q 50/00 |
| | | | 700/83 |
| 2016/0314623 A1* | 10/2016 | Coleman | G06T 19/006 |
| 2017/0045879 A1* | 2/2017 | Yang | G05B 19/414 |
| 2018/0130260 A1* | 5/2018 | Schmirler | G06F 3/011 |
| 2018/0131907 A1* | 5/2018 | Schmirler | H04N 5/23238 |
| 2018/0158247 A1* | 6/2018 | Koyanaka | G05B 19/4069 |
| 2018/0174366 A1* | 6/2018 | Nishibe | G06F 3/013 |
| 2018/0218544 A1* | 8/2018 | Coleman | B23D 59/00 |
| 2019/0129675 A1* | 5/2019 | Ochiai | G05B 23/0216 |
| 2019/0147655 A1* | 5/2019 | Galera | G06T 19/20 |
| | | | 345/419 |
| 2019/0339688 A1 | 11/2019 | Celia et al. | |
| 2019/0340909 A1* | 11/2019 | Nguyen | G08B 21/02 |
| 2020/0387127 A1 | 12/2020 | McGill et al. | |
| 2020/0401861 A1 | 12/2020 | Akechi et al. | |
| 2021/0027458 A1* | 1/2021 | Chor | G06F 16/5838 |

* cited by examiner

DATA COLLECTION SETTING DEVICE OF INDUSTRIAL MACHINE

This application is based on and claims the benefit of priority from Japanese Patent Application No. 2019-102718, filed on 31 May, 2019, the content of which is incorporated herein by reference.

BACKGROUND OF THE INVENTION

Field of the Invention

The present invention relates to a data collection setting device of an industrial machine.

Related Art

A data collection system that collects various data of a plurality of industrial machines intensively to a data collecting device has been known (e.g., refer to Japanese Unexamined Patent Application, Publication No. 2018-173858).

Patent Document 1: Japanese Unexamined Patent Application, Publication No. 2018-173858

SUMMARY OF THE INVENTION

In such a data collection system, the operator enters settings as to which data of which industrial machine is collected in which data collecting device, from, for example, a WEB screen or an external setting device. Therefore, there has been a problem in that it is difficult to perform these settings intuitively and reliably while matching these settings to reality, and a problem in that the operation is complicated.

As such, in the field of data collection of such an industrial machine, it is desirable to carry out the setting for collecting various kinds of data of a desired industrial machine in a data collecting device intuitively and simply.

A data collection setting device of an industrial machine according to the present disclosure which performs setting for collecting data of the industrial machine to a data collecting device, includes: a display unit that displays augmented reality in which a virtual reality superimposed on the real world; an industrial machine identifying unit that identifies the industrial machine in the real world displayed on the display unit; a data display control unit that displays, on the display unit, a virtual object relating to the data which are collectable in the industrial machine identified by the industrial machine identifying unit; a data collecting device display control unit that displays, on the display unit, an object indicating the data collecting device; an operation determining unit that determines operation of an operator with respect to the virtual object relating to the data and the object indicating the data collecting device displayed on the display unit, and identifies the data and the data collecting device; and a data collection setting generating unit that generates a setting for collecting the identified data of the industrial machine in the identified data collecting device.

According to the present, disclosure, in the field of data collection of such an industrial machine, it is possible to carry out the setting for collecting various kinds of data of a desired industrial machine in a data collecting device intuitively and simply.

DETAILED DESCRIPTION OF THE INVENTION

Hereinafter, a description will be given of an example of an embodiment of the present invention with reference to the accompanying drawings. It should be noted that the same reference numerals will be given to the same or equivalent parts in the drawings.

Figure 1:
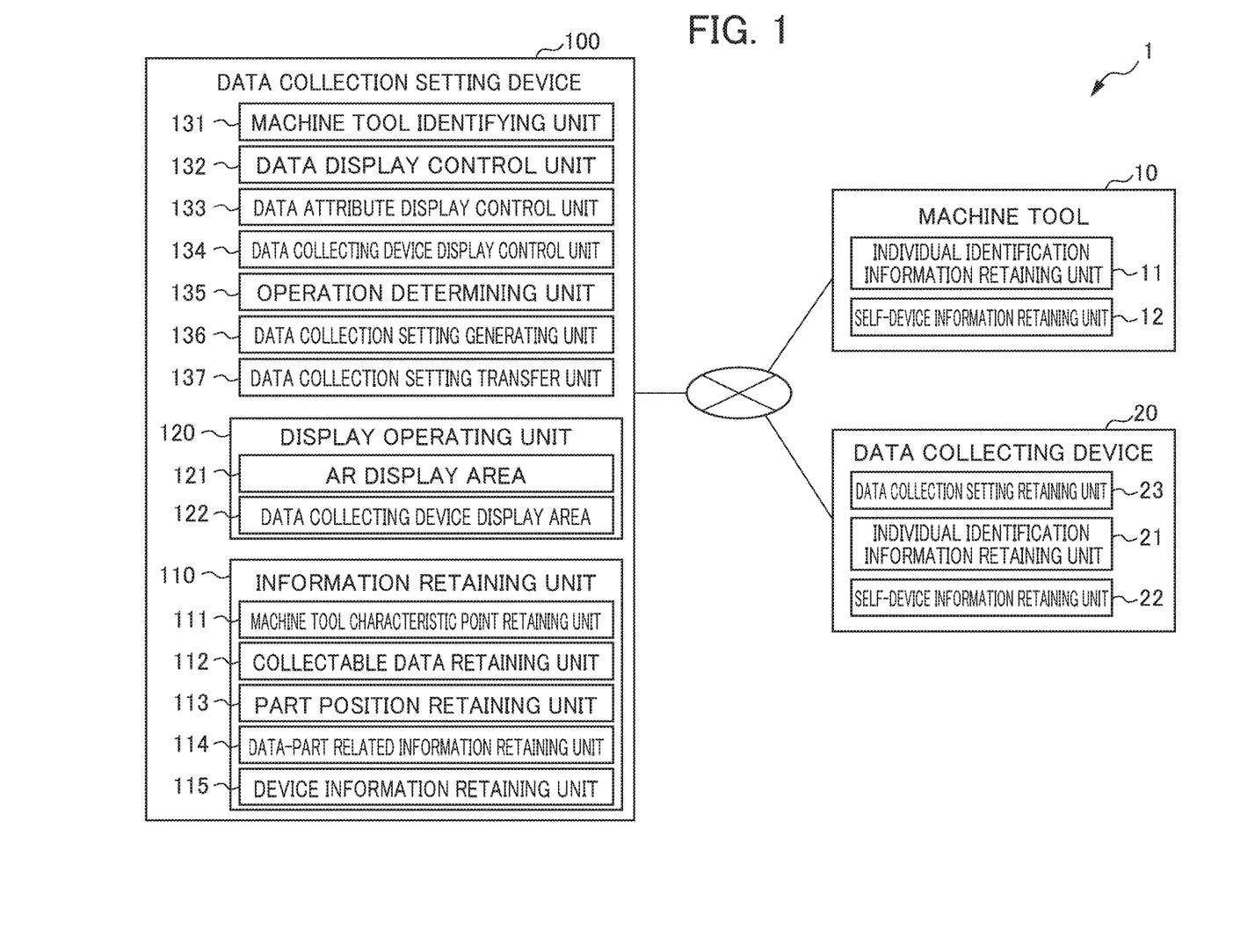
FIG. 1 is a diagram showing the configuration of a data collection system including a data collection setting device of a machine tool according to the present embodiment.
Figure 2:
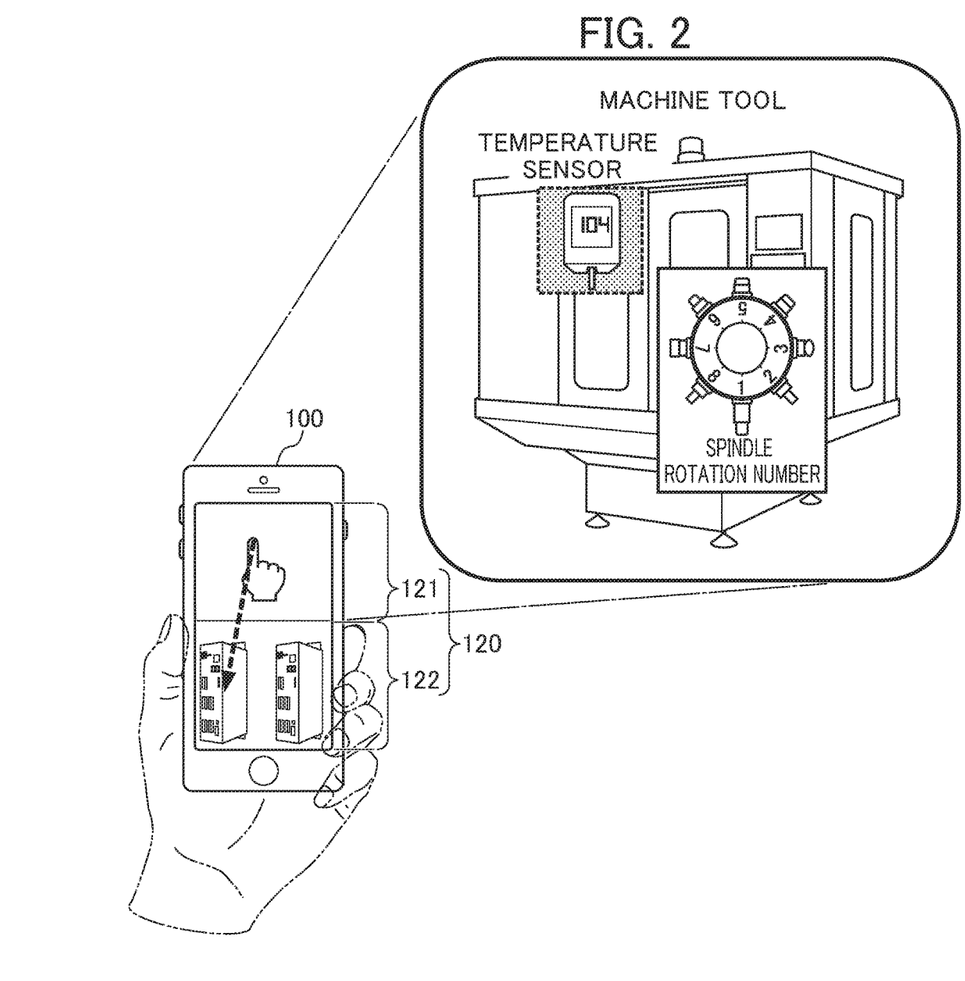
FIG. 2 is a diagram showing an example of augmented reality (AR) display by the data collection setting device (for example, smartphone) of the machine tool according to the present embodiment.

FIG. 1 is a diagram showing a configuration of a data collection system including a data collection setting device of a machine tool according to the present embodiment, and FIG. 2 is a diagram showing an example of display by the data collection setting device of the machine tool according to the present embodiment. In the data collection system 1 shown in FIG. 1, a plurality of machine tools 10 (only one shown in FIG. 1), a plurality of data collecting devices 20 (only one shown in FIG. 1), and the data collection setting device 100 are connected by a wired or wireless network such as LAN and WAN, or short-range communication such as Bluetooth and Wi-Fi.

The machine tool 10 is, for example, a device for performing predetermined machining by numerical control. The machine tool 10 includes an individual identification information retaining unit 11 and a self-device information retaining unit 12.

The individual identification information retaining unit 11 retains an identifier unique to a machine tool such as RFID, beacon, a serial number, or a QR code as individual identification information. Alternatively, the individual identification information retaining unit 11 retains the position information of the machine tool as the individual identification information.

The self-device information retaining unit 12 retains the self-device information in the network, for example, an IP address. Furthermore, the self-device information retaining unit 12 retains the data information that is collectable in its own device.

The data collecting device 20 is, for example, a host computer. The data collecting device 20 collects data of the machine tool 10 on the basis of the data collection setting supplied from the data collection setting device 100 to be described later. The data collecting device 20 includes an individual identification information retaining unit 21, a self-device information retaining unit 22, and a data collection setting retaining unit 23.

The individual identification information retaining unit 21 retains an identifier unique to a data collecting device such as RFID, beacon, a serial number, or a QR code as individual identification information. Alternatively, the individual identification information retaining unit 21 retains the position information of the data collecting device as individual identification information.

The self-device information retaining unit 22 retains self-device information in the network, for example, an IP address.

The data collection setting retaining unit 23 retains the data collection setting supplied from the data collection setting device 100 to be described later.

The data collection setting device 100 performs settings for collecting data of the machine tool 10 in the data collecting device 20. The data collecting and setting device 100 is, for example, an information processing device such as a smartphone, a tablet, a PC, or the like. The data collection and setting device 100 includes an information retaining unit 110, a display operating unit 120, a machine tool identifying unit 131, a data display control unit 132, a data attribute display control unit 133, a data collecting device display control unit 134, an operation determining unit 135, a data collection setting generating unit 136, and a data collection setting transfer unit 137.

The data collection setting device 100 (excluding the information retaining unit 110 and the display operating unit 120) is composed of an arithmetic processor such as a DSP (Digital Signal Processor) and an FPGA (Field Programmable Gate Array). The various functions of the data collection setting device 100 (excluding the information retaining unit 110 and the display operating unit 120) are realized by executing predetermined software (program, application) stored in a storage unit, for example. The various functions of the data collection setting device 100 (excluding the information retaining unit 110 and the display operating unit 120) may be realized in cooperation with hardware and software, or may be realized only by hardware (electronic circuit).

The information retaining unit 110 is, for example, rewritable memory such as EEPROM, or a rewritable disk such as an HDD (Hard Dish Drive) or SSD (Solid State Drive). The information retaining unit 110 includes a machine tool characteristic point retaining unit 111, a collectable data retaining unit 112, a part position retaining unit 113, a data-part related information retaining unit 114, and a device information retaining unit 115.

The machine tool characteristic point retaining unit 111 retains a characteristic point of the machine tool for identifying a machine tool. Examples of the characteristic points of the machine tool include size, shape, color, manufacturer's indication, and model number indication. The machine tool characteristic point retaining unit 111 retains the characteristic point of the machine tool in association with the data of the machine tool.

The collectable data retaining unit 112 retains data-collectable data for each machine tool. Examples of the data-collectable data include temperature of the temperature sensor, data of the vibration sensor, the spindle rotation number, the control axis rotation number, the tool life, the numerical control data, and the circuit information of the programmable logic controller.

The part position retaining unit 113 retains the position of the part corresponding to the data-collectable data for each machine tool. Examples of the parts corresponding to the data-collectable data include the temperature sensor, the vibration sensor, various motors, tools, a storage unit of coolant, and IO devices.

The data-part related information retaining unit 114 retains, for each machine tool, the data-part related information in which the data retained by the collectable data retaining unit 112 is associated with the position of the part corresponding to the data-collectable data retained by the part position retaining unit 113.

The device information retaining unit 115 retains individual identification information of the machine tool 10 connected via a network, e.g., an identifier unique to a machine tool such as RFID, beacon, a serial number, or a QR code, or position information of the machine tool 10. Furthermore, the device information retaining unit 115 retains the self-device information in the network of these machine tools 10 for example, an IP address.

Furthermore, the device information retaining unit 115 also retains the individual identification information of the data collecting device 20 connected via a network, for example, an identifier unique to a data collecting device such as RFID, beacon, a serial number, or a QR code, or the position information of the data collecting device 20. Furthermore, the device information retaining unit 115 retains the self-device information in the network of these data collecting device 20, for example, an IP address.

The display operating unit 120 includes a display device such as a liquid crystal display, and includes an AR display area 121 and a data collecting device display area 122. The AR display area 121 is an area for displaying Augmented Reality (AR) in which virtual reality is superimposed on the real world, and displays by superimposing a virtual object on the machine tool in the real world projected by an imaging device such as a camera. The data collecting device display area 122 displays an object indicating the data collecting device.

In addition, the display operating unit 120 includes an operation device such as a touch panel, and detects operation by an operator.

The machine tool identifying unit 131 identifies a machine tool in the real world displayed on the AR display area 121 of the display operating unit 120. For example, the machine tool identifying unit 131 extracts the characteristic point of the machine tool displayed on the AR display area 121, such as size, shape, color, manufacturer's indication, and model number indication, and identifies the type of machine tool displayed on the AR display area 121 on the basis of the characteristic point of the machine tool retained in the machine tool characteristic point retaining unit 111.

Furthermore, the machine tool identifying unit 131 acquires the individual identification information (e.g., RFID, beacon, a serial number, or a QR code) of the machine tool in the real world displayed on the AR display area 121, and identifies the machine tool displayed on the AR display area 121 on the basis of the individual identification information of the machine tool retained in the device information retaining unit 115.

Alternatively, the machine tool identifying unit 131 may acquire the position information by the radio wave intensity positioning or the like in RFID or beacon of the machine tool in the real world displayed on the AR display area 121, and may identify the machine tool displayed on the AR display area 121 on the basis of the position information of the machine tool retained in the device information retaining unit 115.

Alternatively, the machine tool identifying unit 131 may identify the machine tool on the basis of the combination of the position information by the positioning described above and the above-described individual identification information or self-device information (e.g., IP address).

The data display control unit 132 displays or highlights, on the AR display area 121, virtual objects relating to data which are collectable in the machine tool identified by the machine tool identifying unit 131 on the basis of the data which are collectable (data-collectable data) retained in the collectable data retaining unit 112, the position of a part corresponding to the data which are collectable retained in the part position retaining unit 113, and the data-part related information retained in the data-part related information retaining unit 114 (see FIG. 2). Furthermore, the data display control unit 132 may display or highlight a virtual object relating to a part corresponding to the data that are collectable on the AR display area 121.

Figure 3:
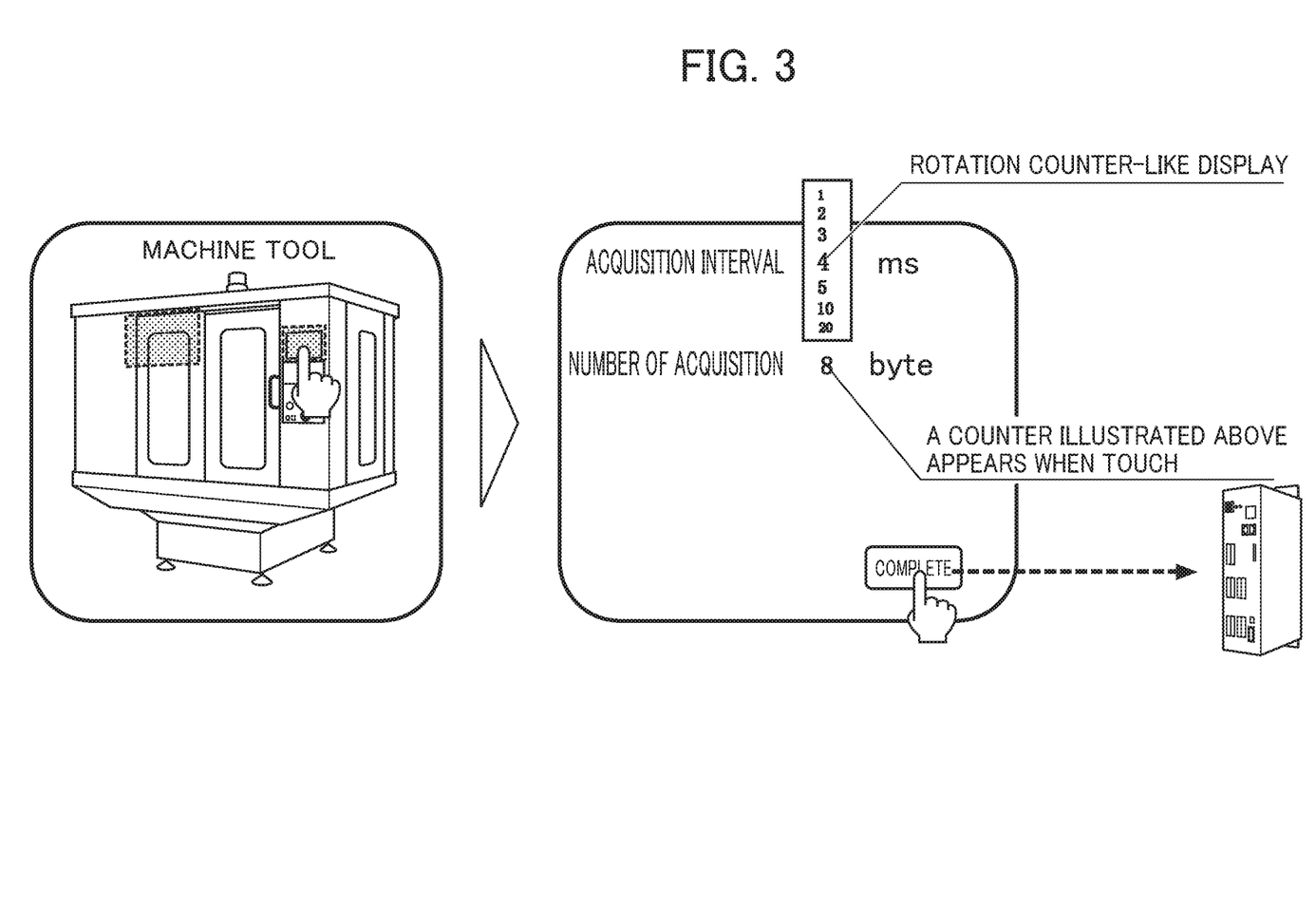
FIG. 3 is a diagram showing an example of augmented reality (AR)) display by the data collection setting device (for example, smartphone) of the machine tool according to the present embodiment.

The data attribute display control unit 133 displays options of data attributes (e.g., a display such as a counter) on the AR display area 121 in a case in which there is an attribute (e.g., a unit, an acquisition interval, a number of acquisition) associated with the data which are collectable (see FIG. 3).

The data collecting device display control unit 134 displays an object indicating the data collecting device on the data collecting device display area 122 (see FIG. 2). Furthermore, the data collecting device display control unit 134 may highlight the data collecting device identified by the operation determining unit 135 to be described later.

The operation determining unit 135 determines operation by an operator with respect to a virtual object relating to data displayed in the AR display area 121 and an object indicating the data collecting device displayed in the data collecting device display area 122, and identifies data of a machine tool from which data is collected and the data collecting device. For example, the operation determining unit 135 identifies the data of the machine tool from which data is collected and the data collecting device in accordance with the operation of dragging the virtual object relating to the desired data displayed on the AR display area 121 to the object indicating the desired data collecting device displayed on the data collecting device display area 122 (see FIG. 2).

Furthermore, the operation determining unit 135 determines the operation of the operator with respect to the option of data attributes displayed on the AR display area 121 and identifies the data attributes. For example, the operation determining unit 135 identifies the data attribute in accordance with the operation of tapping an option of the data attributes displayed on the AR display area 121 or an operation of dragging the option of the data attributes to the object of the data collecting device (see FIG. 3).

The data collection setting calculating unit 136 generates a setting file that collects the data of the machine tool identified by the operation determining unit 135 to an identified data collecting device with the identified data attribute. This setting file includes the network identification information (e.g., IP address) of the machine tool and the data collecting device retained in the device information retaining unit 115.

The data collection setting transfer unit 137 transfers the generated setting file to the identified data collecting device on the basis of the network identification information (e.g., IP address) of the data collecting device retained in the device information retaining unit 115.

Figure 4:
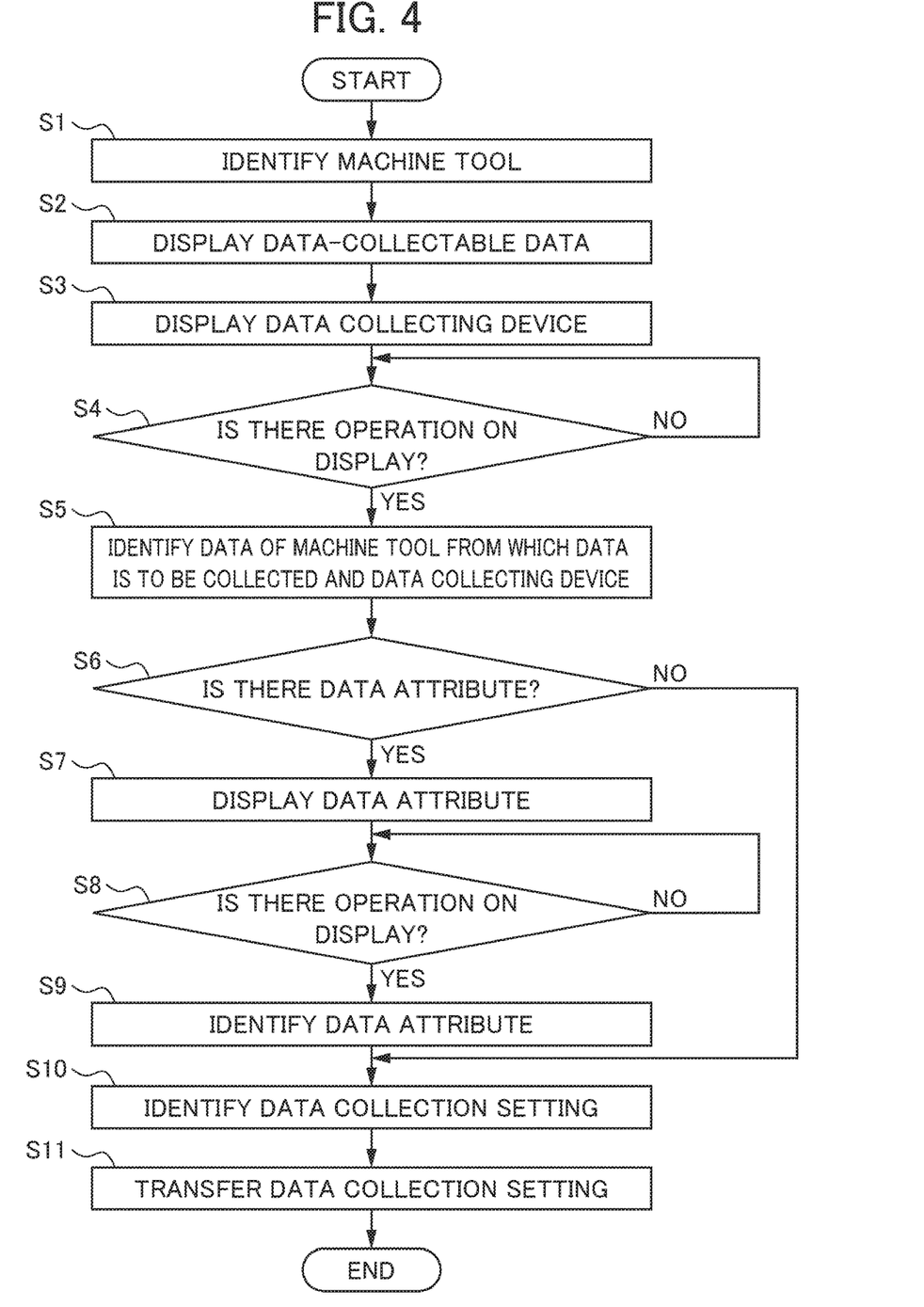
FIG. 4 is a diagram showing a flowchart of data collection setting operation by the data collection setting device of the machine tool according to the present embodiment.

Next, with reference to FIG. 4, a description will be given of data collection setting operation by the data collection setting device of the machine tool according to the present embodiment. FIG. 4 is a flowchart of data collection setting operation by the data collection setting device of the machine tool according to the present embodiment.

First, an operator projects a desired machine tool on the AR display area 121 of the display operating unit 120 by an imaging device such as a camera (see FIG. 2).

Then, the machine tool identifying unit 131 extracts the characteristic points of the machine tool displayed on the AR display area 121, for example, size, shape, color, manufacturer's indication, and model number indication, and identifies the type of the machine tool in the real world displayed on the AR display area 121 on the basis of the characteristic points of the machine tool retained in the machine tool characteristic point retaining unit 111 (S1).

Furthermore, the machine tool identifying unit 131 acquires individual identification information (e.g., RFID, beacon, a serial number, or a QR code) of the machine tool in the real world displayed on the AR display area 121 and identifies the machine tool in the real world displayed on the AR display area 121 on the basis of the individual identification information of the machine tool retained in the device information retaining unit 115 (S1).

Alternatively, the machine tool identifying unit 131 may acquire position information by radio wave intensity positioning or the like in RFID or beacon of the machine tool in the real world displayed on the AR display area 121 and identify the machine tool in the real world displayed on the AR display area 121 on the basis of the position information of the machine tool retained in the device information retaining unit 115.

Next, the data display control unit 132 displays, on the AR display area 121, a virtual object relating to data which are collectable in the machine tool identified by the machine tool identifying unit 131 or a virtual object relating to a part corresponding to data which are collectable (data-collectable data) on the basis of data which are collectable in the collectable data retaining unit 112, the position of a part corresponding to the data-collectable data retained in the part position retaining unit 113, and the data-part related information retained in the data-part related information retaining unit 114 (refer to FIG. 2) (S2).

At this moment, the data collecting device display control unit 134 displays, on the data collecting device display area 122 of the display operating unit 120, an object indicating all the data collecting devices connected to the network on the basis of the information of the data collecting device retained in the device information retaining unit 115 (S3).

In the example of FIG. 2, in a case in which the temperature (data) of the temperature sensor (part) in the machine tool is collectable, in the machine tool in the real world, the vicinity of the position of the temperature sensor is highlighted, for example, in red, and the virtual objects of the temperature sensor and temperature are displayed. For example, the virtual object is displayed at a position and depth as if the temperature sensor were in a position in the real world. According to this, it is possible to easily recognize the data-collectable data intuitively by the operator.

Furthermore, in the example of FIG. 2, in a case in which the spindle rotation speed (data) in the machine tool is collectable, in the machine tool in the real world, a virtual object of a tool holder is displayed near the position of the tool (part), and the tool in use is highlighted, for example, in red. For example, the virtual object is displayed at a position and depth as if the tool or tool holder were at a position in the real world. According to this, it is possible to easily recognize the data-collectable data intuitively by the operator.

Next, the operation determining unit 135 determines operation of the operator with respect to the virtual object relating to the data displayed on the AR display area 121 and the object indicating the data collecting device displayed on the data collecting device display area 122 (S4). If there is no operation by the operator, the processing returns to Step S4.

Meanwhile, for example, the operator performs operation of dragging a virtual object relating to the desired data displayed on the AR display area 121 to an object indicating a desired data collecting device displayed on the data collecting device display area 122. Then, the operation determining unit 135 identifies the data of the machine tool from which data is to be collected and the data collecting device (S5).

At this time, the data collecting device display control unit 134 may highlight the identified data collecting device (e.g., displaying something such as a red film). According to this, it is possible for the operator to recognize the identified data collecting device intuitively.

Next, the data attribute display control unit 133 determines whether there is a data attribute (e.g., a unit, an acquisition interval, a number of acquisition) in the identified data (S6). In a case in which there is a data attribute, the data attribute display control unit 133 displays, on the AR display area 121, options of the data attributes (e.g., display like a counter: an operation interface) (see FIG. 3) (S7). On the other hand, in a case in which there is no data attribute, the processing advances to Step S10.

Next, the operation determining unit 135 determines operation of the operator with respect to the options of the data attributes displayed on the AR display area 121 (S8). If there is no operation by the operator, the processing returns to Step S8.

Meanwhile, for example, the operator performs an operation of tapping the option of the desired data attribute displayed on the AR display area 121 or performs an operation of dragging the option of the data attribute to an object of the data collecting device. Then, the operation determining unit 135 identifies the data attribute (see FIG. 3) (S9).

Next, in Step S10, the data collection setting generating unit 136 generates a setting file for collecting the data of the machine tool identified by the operation determining unit 135 in the identified data collecting device with the identified data attribute. This setting file includes the network identification information (e.g., IP address) of the machine tool and the data collecting device retained in the device information retaining unit 115.

Then, the data collection setting transfer unit 137 transfers the generated setting file to the identified data collecting device on the basis of the network identification information (e.g., IP address) of the data collecting device retained in the device information retaining unit 115 (S11).

As described above, the data collection setting device 100 of the machine tool of the present embodiment performs the following operations:

identifying the machine tool in the real world displayed on the AR display area 121;

displaying, on the AR display area 121, a virtual object relating to the data-collectible data in the identified machine tool, and an object indicating the data-collecting device;

determining the operation of the operator with respect to the virtual object relating to the displayed data and the object indicating the data collecting device, and identifying the data and data collecting device; and generating settings to collect the data of the identified machine tool in the identified data collecting device.

Thus, for example, the operator can perform the following operations:

the operator projects the desired machine tool on the AR display area 121 by an imaging device such as a camera; and by simply performing an intuitive and simple operation (gesture operation) such as dragging the virtual object relating to the desired data in the desired machine tool displayed on the AR display area 121 to an object indicating the desired data collecting device, the operator can generate settings for collecting the data of the desired machine tool to the desired data collecting device.

Furthermore, according to the data collection setting device 100 of the machine tool of the present embodiment, the operator can selectively set the collection data and the data collecting device in consideration of the purpose of data collection. Furthermore, for example, if the purpose is to collect data in relation to the life, it is preferable to collect the data relating to the use environment such as the operating rotation speed and the environmental temperature of the tool to the same data collecting device. In the case of having a plurality of collectable data such as a tool (rotational speed, life), a virtual object that allows the operator to further select a plurality of data when the tool is selected may be provided to the operator.

Furthermore, according to the data collection setting device 100 of the machine tool of the present embodiment, the operator can selectively set the collection data and the data collecting device in consideration of the free space of the data collecting device.

MODIFICATION EXAMPLE

In the above-described embodiment, a data collection setting device such as a smartphone, a tablet, or a PC is exemplified. However, the present embodiment is not limited thereto, and as shown in FIG. 5, the data collection setting device may be an AR glass.

Figure 5:
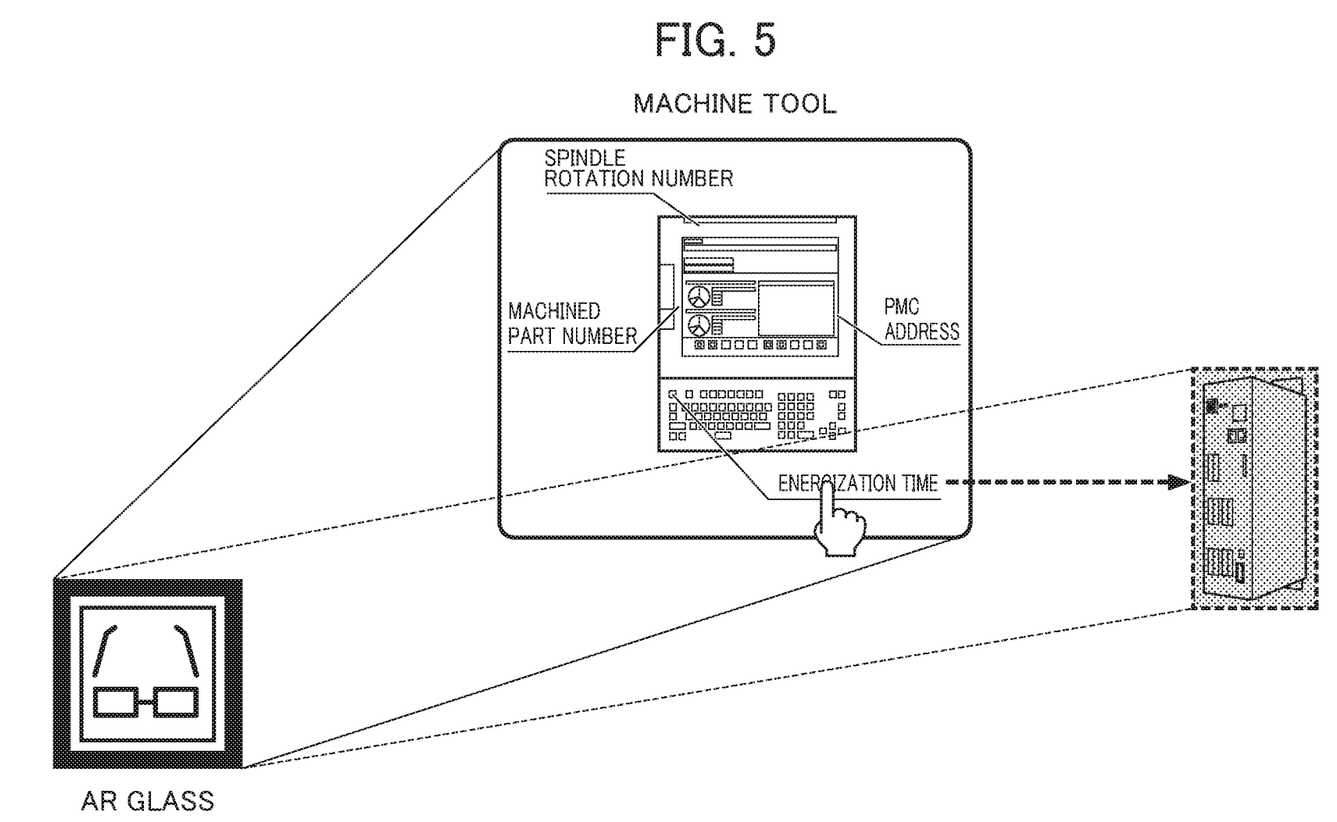
FIG. 5 is a diagram showing an example of augmented reality (AR) display by the data collection setting device (for example, AR glass) of the machine tool according to a modification example of the present embodiment.

In the example of FIG. 5, in a case in which the control data relating to numerical control in a machine tool is collectable, virtual objects of information of the control data (spindle speed, number of machined parts, PMC address, energization time, etc.) are displayed with respect to the control data displayed on display unit of the machine tool in the real world. At this time, similarly to the above-described case, in a case in which the operator performs an operation of dragging (gesture operation) the virtual object relating to the desired control data to the object indicating the desired data collecting device, the operation determining unit 135 identifies the control data of the machine tool to be collected and the data collecting device, and the data collection setting generating unit 136 generates settings for collecting the data of the identified machine tool in the identified data collecting device.

Although embodiments of the present invention have been described above, the present invention is not limited to the embodiments described above, and various modifications and variations are possible. For example, in the above-described embodiment, a data and setting device for setting to collect the data of the machine tool in the data collecting device is exemplified; however, the present embodiment is not limited thereto. The data and setting device of the present embodiment is applicable to various devices for setting to collect the data of various industrial machines in a data collecting device.

EXPLANATION OF REFERENCE NUMERALS

1 data collection system
10 machine tool 11 individual identification information retaining unit
12 self-device information retaining unit
20 data collecting device
21 individual identification information retaining unit
22 self-device information retaining unit
23 data collection setting retaining unit
100 data collection setting device
110 information retaining unit
111 machine tool characteristic point retaining unit
112 collectable data retaining unit
113 part position retaining unit
114 data-part related information retaining unit
115 device information retaining unit
120 display operating unit
121 AR display area
122 data collecting device display area
131 machine tool identifying unit.
132 data display control unit
133 data attribute display control unit
134 data collecting device display control unit
135 operation determining unit
136 data collection setting generating unit
137 data collection setting transfer unit

What is claimed is:

1. A data collection setting device of an industrial machine which performs setting for collecting data of the industrial machine to a data collecting device, the data collection setting device comprising a processor, the processor being configured to:
display, on a display of the data collection setting device, augmented reality in which a virtual reality is superimposed on a corresponding real image of the real world;
identify the industrial machine in the corresponding real image of the real world displayed on the display;
project, on the display by an imaging device of the data collection setting device, a virtual object superimposed on the industrial machine relating to the data which are collectable in the identified industrial machine;
display, on the display, an object indicating the data collecting device, wherein the data collecting device collects the data of the industrial machine;
determine operation of an operator operating the data collection setting device with respect to the virtual object relating to the data and the object indicating the data collecting device displayed on the display, and identify the data and the data collecting device in accordance with the operation by the operator with respect to the virtual object relating to the data superimposed on the industrial machine and the object indicating the data collective device; and
generate a setting file for collecting data of the industrial machine based on the identified data of the industrial machine in the identified data collecting device.

2. The data collection setting device of the industrial machine according to claim 1, wherein the processor identifies the industrial machine on a basis of at least one of a characteristic point, identification information, and position information of the industrial machine.

3. The data collection setting device of the industrial machine according to claim 1, wherein the processor displays, on the display, in a highlighted manner the virtual object relating to the data.

4. The data collection setting device of the industrial machine according to claim 1, wherein the processor displays the virtual object of a part of the industrial machine corresponding to the data that are collectable in the industrial machine or the virtual object of a sensor for collecting the data at a position of the sensor.

5. The data collection setting device of the industrial machine according to claim 1, wherein the processor displays, on the display, in a highlighted manner an object indicating the identified data collecting device.

6. The data collection setting device of the industrial machine according to claim 1, wherein the processor identifies the data and the data collecting device in accordance with the operation of the operator dragging the virtual object relating to the data displayed on the display to the object indicating the data collecting device.

7. A data collection setting device of an industrial machine which performs setting for collecting data of the industrial machine to a data collecting device, the data collection setting device comprising a processor, the processor being configured to:
display, on a display of the data collection setting device, augmented reality in which a virtual reality is superimposed on a corresponding real image of the real world;
identify the industrial machine in the corresponding real image of the real world displayed on the display;
project, on the display by an imaging device of the data collection setting device, a virtual object superimposed on the industrial machine relating to the data which are collectable in the identified industrial machine;
display, on the display, an object indicating the data collecting device, wherein the data collecting device collects the data of the industrial machine;
determine operation of an operator operating the data collection setting device with respect to the virtual object relating to the data and the object indicating the data collecting device displayed on the display, and identify the data and the data collecting device in accordance with the operation by the operator with respect to the virtual object relating to the data superimposed on the industrial machine and the object indicating the data collective device;
display, on the display, an option of an attribute relating to the data which are collectable in the industrial machine;
determine an operation of the operator with respect to the option of the attribute relating to the data displayed on the display and identify the attribute relating to the data;
generate a setting file for collecting data of the industrial machine based on the identified data of the industrial machine in the identified data collecting device with the attribute relating to the identified data; and
transfer the generated setting file from the data collection setting device to the identified data collecting device,
wherein the generated setting file of data collection includes network identification information of the industrial machine and the data collecting device.

8. The data collection setting device of the industrial machine according to claim 7, wherein the processor displays the virtual object of a part of the industrial machine corresponding to the data that are collectable in the industrial machine or the virtual object of a sensor for collecting the data at a position of the sensor.

* * * * *